Dec. 28, 1926.
1,612,177
P. CATUCCI
FISHING REEL
Filed March 21, 1925
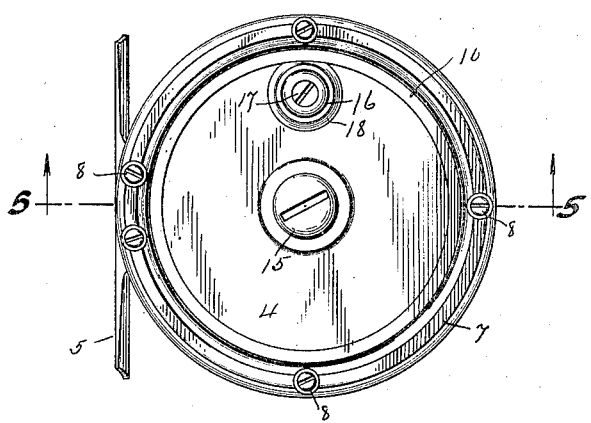
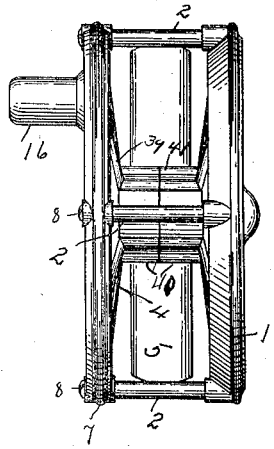
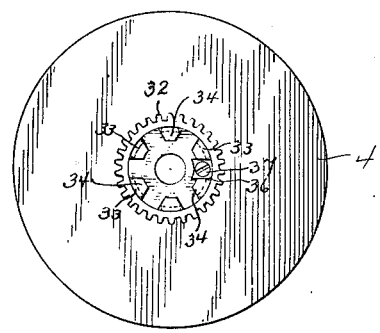
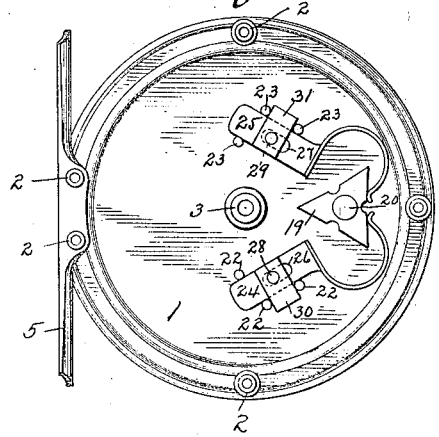
Inventor
Pliny Catucci
By his Attorney
Louis M. Sanders Patented Dec. 28, 1926.

1,612,177

UNITED STATES PATENT OFFICE.

PLINY CATUCCI, OF NEWARK, NEW JERSEY.

FISHING REEL.

Application filed March 21, 1925. Serial No. 17,420.

My improved reel is what is known in the art as a trout reel. This is not the usual form of fishing reel, in that it has no multiplying gear train. The frame of the reel is made of some self-hardening composition, as for example bakelite, condensite, vulcanite, or the like, with suitable metallic cores for the same so as to afford the requisite strength in the completed structure.

One of the minor features in the improvement resides in the adjustable click mechanism, whereby the click spring may be given greater or less tension. Another minor feature or improvement resides in the means of securing the foot plate to the frame posts.

In the accompanying drawing—

Fig. 1 is a front elevational view of the complete fishing reel.

Fig. 2, is a side view of the same.

Fig. 3 is an inner end view of the spool illustrating the detachably click wheel ring.

Fig. 4, is a plan view of the frame with the spool and head ring removed to show clearly the means for adjusting the click springs.

Fig. 5, is a transverse sectional view taken on line 5—5 of Fig. 1.

Similar reference numerals refer to like parts throughout the specification and drawing.

The frame of my improved reel is made up of the back plate 1 from which a series of frame posts 2 project, said frame posts being moulded into the plastic composition of which the back plate is made. A central spool shaft 3 is also mounted in the center of said back plate to form a support for the spool 4. The posts 2 are metal and are uniformly distributed, as shown in Figs. 1 and 4, about the flanged rim of the back plate. Two of such posts are shown to which the foot plate 5 is secured, said foot plate being provided with apertures through which said frame posts 2 are inserted and held in place by means of a cone-pointed screw 6. Upon the outer ends of the series of frame posts 2, I mount a head ring 7, securing the same in place by means of a series of screws 8 inserted through the body of the ring and into the ends respectively of the frame posts 2 as shown in Fig. 1. The head ring 7 is made of the plastic composition above described, and in order to give it requisite strength, I provide a metallic core 9; said core being stamped into a ring shape and corrugated in cross section to give it the requisite strength. This core is inserted into the mold or die into which the composition is forced under pressure so that said core is completely imbedded in the interior of the head ring. When said head ring is secured by means of the screws 8, as above described, a perfectly rigid frame is formed with the foot plate 5 secured thereto.

The spool 4, is sectional and is moulded of the same plastic material as above described and originally made in two parts, as the flanges 10 and 11 with inreaching hubs 12 and 13. The flange 11 with its hub 13 is moulded with a sleeve bearing 14 in the center thereof. The two flanges are secured together upon the metallic sleeve bearing 14, thus forming a rigid spool 4 upon which to wind the line. A broad headed screw 15 is screwed into the end of the stub shaft 3 to hold the spool 4 upon said stub shaft and to permit the same to rotate freely thereon. The crank 16 is mounted to freely turn upon the screw 17, which latter is inserted in a boss 18 near the rim of the outer flange 10.

In order to afford space for the click mechanism it will be noted that the back plate 1 is made cup shape and of a sufficient depth to afford space between the spool flange 11 and the back plate in which to mount such click mechanism. The click in the present case is what is known as the fixed type of click; that is, it is always in operation. It consists of a triangular click 19 pivotally secured to the back plate by means of a screw 20, which is inserted into the back plate as shown. In the back plate and located upon opposite sides of the stub shaft are the two series of guide studs 22 and 23; guided between these sets of studs, as clearly shown, are the two click springs 24, 25, which have their bent ends turned into arc shape to bear upon the outer flat side of the click 19. The flat bases of the springs 24 and 25, are slotted as at 26, 27, to take over the two set screws 28, 29, respectively, said set screws being screwed in from the back side of the back plate and into the clamping nuts 30, 31, as clearly shown in Fig. 4. By this means the two click springs 24, 25 may be adjusted back and forth to the limit of their respective slots 26, 27, and fixed in such adjusted position by screwing up the two screws 28, 29 into the clamping nuts 30, 31 so as to clamp said click springs in their adjusted position to give the proper pressure upon the outer face of the click 19. The making of the click 19, triangular as shown in Fig 4, permits the change of the position of said click to bring another one of the angular points toward the center to bear upon the click wheel as the points wear. The click wheel 32, consists of a ring with the gear teeth as shown in Fig. 3, said ring having a series of inward projections as 33. The end of the sleeve bearing 14, is castellated, as shown in Fig. 3, with each of the projections 34 provided with a circumferential groove as 35, into which the above mentioned projections 33 of the click wheel may be turned. It will be noted that the inward projections 33 may be dropped into the castellated slots between the projections 34, given a slight turn to carry the projections 33 into the under cut groove 35. A small key 36 may now be inserted into one of the grooves between the castellated projections 34 and held in place by means of a small screw 37, thus locking the click ring 32 in place. The reason for making the click wheel detachable is that in practice the click wheel wears out and must be replaced and the means described are provided in order that such replacement may be quickly and readily performed.

It will be noted that the inner faces of the spool flanges 10 and 11, are provided with radial beads as 39, such beads extending around upon the spool hubs at 40, 41. When a line is wound upon the spool, this series of beads will support said line and afford a complete air space between the spool and the line wound thereon. This is a material advantage, in that, it affords air circulation about the line thereby permitting the line to be quickly dried out after use.

I claim:

1. A fishing reel having a frame comprising a back plate and a head ring each moulded to form from a plastic self-hardening composition, said back plate being cup shaped and having a plurality of frame posts rigidly moulded into the margin thereof, said head ring having a metal ring core imbedded in its center, and means for rigidly securing said head ring to the outer ends of said frame posts.

2. A fishing reel having a frame comprising a back plate and a head ring each moulded to form from a plastic self-hardening composition, said back plate being cup shaped, a plurality of metal frame posts rigidly molded into the margin of said back plate, a corrugated metal ring core imbedded in said head ring, means for rigidly securing said head ring to the outer ends of said frame posts, and a spool shaft fixedly imbedded in said back plate at its center, during the molding of the plate.

3. In a fishing reel, the combination of a back plate and a head ring each molded from a plastic non-metallic self-hardening composition, a plurality of frame posts embedded into the margin of said back plate, means for detachably securing said head ring to the outer ends of said posts to form a rigid reed frame, a spool shaft embedded in said back plate at its center, a sectional spool having inreaching hub elements interengaged, one of said hub elements extending through the other flush with said head ring, a sleeve interjacent said extending hub element and said shaft, and means for securing said spool upon said shaft against accidental displacement.

4. A spool for fishing reels comprising a pair of separate spool flanges molded from a plastic non-metallic self-hardening composition, interengaging hubs on said flanges, and a metallic bearing sleeve upon which said hubs and flanges are rigidly mounted.

5. A spool for fishing reels comprising a pair of separate spool flanges molded from a plastic non-metallic self-hardening composition, interengaging hubs on said flanges a metallic bearing sleeve upon which said flanges and hubs are rigidly mounted, and a plurality of radial beads, molded upon the inner faces of said flanges and the exposed peripheries of said hubs whereby to form a continuous air space beneath a line wound upon said spool.

PLINY CATUCCI.